(12) United States Patent
Choueifaty

(10) Patent No.: US 7,958,038 B2
(45) Date of Patent: Jun. 7, 2011

(54) METHODS AND SYSTEMS FOR PROVIDING AN ANTI-BENCHMARK PORTFOLIO

(76) Inventor: Yves Choueifaty, Neuilly sur Seine (FR)

( * ) Notice: Subject to any disclaimer, the term of this patent is extended or adjusted under 35 U.S.C. 154(b) by 291 days.

(21) Appl. No.: 11/821,261

(22) Filed: Jun. 22, 2007

(65) Prior Publication Data

US 2008/0222052 A1 Sep. 11, 2008

Related U.S. Application Data

(60) Provisional application No. 60/816,276, filed on Jun. 22, 2006.

(51) Int. Cl.
*G06Q 40/00* (2006.01)
(52) U.S. Cl. ...................................... 705/36 R
(58) Field of Classification Search .............. 705/35–40
See application file for complete search history.

(56) References Cited

U.S. PATENT DOCUMENTS

| | | |
|---|---|---|
| 5,806,047 A | 9/1998 | Hackel et al. |
| 6,601,044 B1 | 7/2003 | Wallman |
| 2006/0184438 A1 | 8/2006 | McDow |

OTHER PUBLICATIONS

Search results for "equivariant" www.bartleby.com.*
Search results for "equi-variant", www.bartleby.com.*
Geoff Considine "Accounting for Total Portfolio Diversification" 2006.*
Fama, et al., *Diversification Returns and Asset Contributions*, Financial Analysts Journal, May/Jun. 1992, pp. 26-32.
Shay, et al. *Stochastic Portfolio Theory and Stock Market Equilibrium*, The Journal of Finance, vol. 37, No. 2, May 1982, pp. 615-622.
Fernholz, R., *Portfolio Generating Functions*, INTECH, Jun. 2, 1998, pp. 1-19.
Fernholz, R.; *Stock Market Diversity*, INTECH, Jan. 31, 2005, pp. 1-11.

* cited by examiner

*Primary Examiner* — Thomas M Hammond, III
(74) *Attorney, Agent, or Firm* — Young & Thompson

(57) ABSTRACT

In one aspect, the invention comprises a method comprising: (a) acquiring data regarding a first group of securities in a first portfolio; (b) based on said data and on risk characteristics of said first group of securities, identifying a second group of securities to be included in a second portfolio; and (c) calculating holdings in said second portfolio based on one or more portfolio optimization procedures. In another aspect, the invention comprises software for performing the steps described above (as well as steps of other embodiments), and in another aspect, the invention comprises one or more computer systems operable to perform those steps.

27 Claims, 3 Drawing Sheets

Embodiment of Anti-Benchmark Portfolio Construction

METHODS AND SYSTEMS FOR PROVIDING AN ANTI-BENCHMARK PORTFOLIO

CROSS-REFERENCE TO RELATED APPLICATIONS

This application claims the benefit of U.S. Provisional Patent Application No. 60/816,276, filed Jun. 22, 2006. The entire contents of that application are incorporated herein by reference.

INTRODUCTION

In one aspect, the present invention comprises a method and system for selecting and managing a portfolio of securities (for instance, equities or bonds) whose investment universe is a given predefined universe "the benchmark" (for instance the universe of an index). This aspect ("Anti-Benchmark") optimally captures the available risk premium, usually having better expected return and lower expected volatility compared to the predefined portfolio. In an embodiment, the Anti-Benchmark is a method and system for selecting and managing a portfolio of securities with maximum diversification.

In an embodiment, the Anti-Benchmark maximizes diversification within a given universe of securities in order to improve the return to risk ratio and generally leads to lower total volatility. Securities within the defined universe may be run through a program that computes correlations and volatilities of securities' returns. Once the correlations and volatilities are determined, a portfolio is selected. Depending on the benchmark, this portfolio could be, for example, from 10-100 stocks, and will have the investment objective of capturing risk premium to achieve a better return to risk ratio in a selected universe of securities.

Only non-diversifiable risk being rewarded by a risk premium, an embodiment of the Anti-Benchmark product aims at defining optimal portfolios in a mean-variance framework. Provided that diversification in publicly available benchmarks (indices) is not optimal, the Anti-Benchmark, by maximizing diversification, offers an investor the opportunity to invest in a product having a return similar to—and a volatility lower than—the corresponding benchmark. This product will assist investors who have large overweights in the benchmark constituents, and therefore seek diversification.

A tangible result of the product is that, inter alia, the combination of the Anti-Benchmark with a benchmark will have a higher expected return to risk ratio than the benchmark itself.

The Anti-Benchmark will have low correlation, and potentially lower volatility and higher Sharpe ratio compared to standard market cap weighted indices. (The Sharpe ratio was developed to measure risk-adjusted performance, and is calculated by subtracting the risk-free rate from the rate of return for a portfolio and dividing the result by the standard deviation of the portfolio returns. The Sharpe ratio indicates whether the returns of a portfolio are due to smart investment decisions or a result of excess risk. The greater a portfolio's Sharpe ratio, the better its risk-adjusted performance has been.) The product offers the flexibility of being tailored to any benchmark, and can be utilized to increase the Sharpe ratio or decrease the total risk for any client's long-only beta exposure. (Beta is a measure of the volatility of a portfolio in comparison to the market as a whole. Beta may be thought of as the tendency of a portfolio's returns to respond to swings in the market. A beta of 1 indicates that the portfolio's price will tend to move with the market. A beta of less than 1 means that the security will be less volatile than the market. A beta of greater than 1 indicates that the security's price will be more volatile than the market. For example, if a stock's beta is 1.2, it's theoretically 20% more volatile than the market.) Combining Anti-Benchmark with an Index Portfolio will provide clients with a higher risk premium and lower expected total risk. In an embodiment the fund offers clients a way to increase their diversification using a scalable long-only approach. This product will alleviate some of the pressure to search for scalable diversifying return from non-traditional sources.

Biasing a long-only beta exposure towards lower average pair-wise correlation of securities' returns provides better diversification than a market benchmark does. The effect of diversification managed in this way is that the risk premium can be kept and most of the risk associated with common factor and stock-specific risk can be diversified away. The investor will be left with the full available risk premium of the market index, but with significantly less of the bias toward lower compounded returns that can result from using market capitalization weighted benchmarks.

Anti-Benchmark is easy to understand, transparent, and in an embodiment a good replacement for other core strategies for gaining market beta exposure. Since alphas are not predicted, it is less track-record sensitive than many other quantitative portfolio styles. Alpha is a measure of performance on a risk-adjusted basis. Alpha takes the volatility (price risk) of a portfolio and compares its risk-adjusted performance to a benchmark. The excess return of the portfolio relative to the return of the benchmark is the portfolio's alpha. Reliance on theory to provide the strategy's methodology means that the research is not susceptible to the data mining concerns often associated with other quantitative approaches.

Research indicates that designing portfolios with the deliberate intent of having low correlation to indices within acceptable risk management constraints leads to lower risk portfolios without giving up on expected returns over multi-year holding periods.

A portfolio with maximum diversification can capitalize on the inefficiencies of securities valuation without the need to predict alphas to determine stock selection. Anti-Benchmark is a tool that can be used to gravitate toward maximum diversification, and back testing to date indicates that positive alpha is a potential benefit of the Anti-Benchmark process.

In an embodiment, Anti-Benchmark is a purely quantitative active portfolio management system, that requires no human intervention during active security selection. The preferred starting point in the process is an investor universe screened for investibility and for suitability for the model. The system then employs risk characteristics as the sole inputs to the security selection process. Correlation and covariances are utilized to select the securities of the Anti-Benchmark, and final weightings are determined by optimising the diversification of the portfolio, preferably using standard portfolio optimization techniques. Optimization preferably is performed on a periodic or occasional basis, but actual rebalancing is dependent on the deviation from optimal over time.

In an embodiment, investment constraints on the portfolio are built in by setting a maximum level of concentration in any given name. No explicit attempt is made to limit the tracking error (standard deviation of the differences in returns) to an index. Volatility is not constrained either, but, due to the bias for low correlations, is normally lower than the index volatility. If Merger & Acquisition activity or other market information not explicitly handled by the model has a material impact on any of the holdings, it may be dealt with on a case by case basis based on the experience of the investment team.

Positions preferably are monitored on a daily basis using risk management tools. Corporate actions and market information preferably are analyzed for impact on the expected returns, and actions are taken if appropriate based on size of the risk and impact on the overall portfolio. In almost all cases changes to the portfolio weightings are implemented through optimization of the overall portfolio.

GOALS OF SOME EMBODIMENTS

Anti-Benchmark is a quantitative method intended to reconstruct beta to provide significant diversification within a core security allocation to the extent that it can be considered a separate asset class for purposes of asset allocation.

The strategy will have low average pairwise correlation, and potentially lower volatility and higher Sharpe Ratio compared to standard market cap weighted indices.

The strategy offers the flexibility of being tailored to any investor benchmark, and can be utilized to increase the Sharpe ratio or decrease the total risk for any investor's long-beta exposure.

Combining Anti-Benchmark with an Index Portfolio can provide investors the same risk premium with lower total risk.

This product will alleviate some of the pressure in the search for scalable diversifying return through alternative asset class products.

ADVANTAGES OF SOME EMBODIMENTS

Anti-Benchmark pushes closer to the Efficient Frontier (see FIG. 1).

Anti-Benchmark through diversification is a more efficient portfolio than market cap weighted indices.

Combining Anti-Benchmark with an Index tracking portfolio provides a significant diversification.

Adding Anti-Benchmark to an investor's asset mix delivers a higher overall reward to risk ratio.

In one aspect, the invention comprises a method comprising: (a) acquiring data regarding a first group of securities in a first portfolio; (b) based on said data and on risk characteristics of said first group of securities, identifying a second group of securities to be included in a second portfolio; and (c) calculating holdings in said second portfolio based on one or more portfolio optimization procedures.

In various embodiments: (1) said step of identifying is based on calculating a correlation matrix and a covariance matrix; (2) said first group of securities is the same as said second group of securities; (3) said step of identifying comprises maximizing or minimizing a quotient whose numerator is an inner product of a row vector whose components are said holdings in said second portfolio and a column vector of volatilities associated with said holdings in said second portfolio, and whose denominator is a square root of a scalar formed by an inner product of said row vector of said holdings of said second portfolio and a product of said covariance matrix and a column vector of said holdings of said second portfolio, with the maximizing or minimizing done by variation of said holdings of said second portfolio; (4) said step of identifying comprises producing a combined portfolio of proportions of said first portfolio and proportions of said second portfolio, and maximizing or minimizing a quotient whose numerator is an inner product of a row vector whose components are holdings in said combined portfolio with a column vector of volatilities associated with said holdings in said combined portfolio, and whose denominator is a square root of a scalar formed by an inner product of a row vector of holdings of said combined portfolio with a product of said covariance matrix and a column vector of said holdings of said combined portfolio, with the maximizing or minimizing done by variation of said holdings of said second portfolio; (5) said second portfolio provides a full risk premium available in the securities of said second portfolio; (6) said first portfolio and said second portfolio combine to have a higher expected return than said first portfolio while having a lower expected volatility than said first portfolio; (7) said second portfolio maximizes diversification when combined with said first portfolio; (8) the method further comprises optimizing said second portfolio to obtain maximum diversification in said second portfolio; (9) the method further comprises computing an Anti-Benchmark Diversification Ratio for said first portfolio; (10) a combination of said first portfolio and said second portfolio has a higher Sharpe ratio than said first portfolio; (11) the method further comprises optimizing said second portfolio on a periodic basis; and (12) the method further comprises transforming said second portfolio into an equivariant portfolio, and manipulating and back-transforming said equivariant portfolio via a Choueifaty Synthetic Asset Transformation.

In another aspect, the invention comprises software for performing the steps described above, and in another aspect, the invention comprises one or more computer systems operable to perform those steps. Both the software and the computer system will be apparent from the description of the various embodiments of the method provided herein.

DETAILED DESCRIPTION

Figure 1:
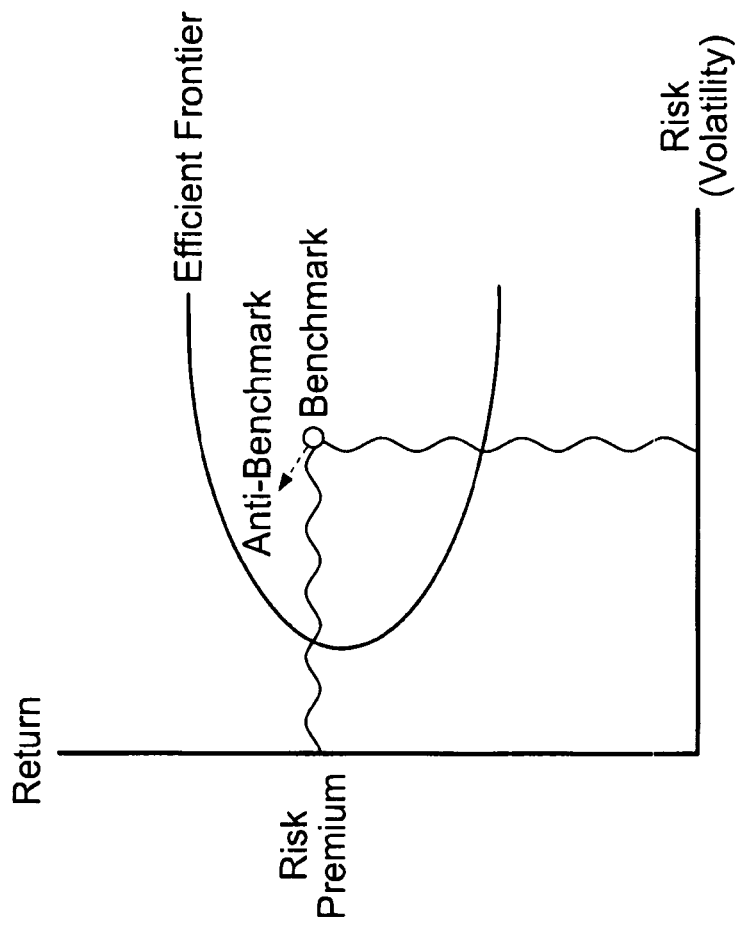
FIG. 1 depicts Anti-Benchmark pushing closer to the efficient frontier.

Universe and Benchmark Selection for Certain Embodiments

Universe can be any set of securities large enough to determine a diversified portfolio.

Benchmark selection is preferably similar to the universe or more narrow.

If a benchmark is broadly defined and includes illiquid securities, it is preferable to apply a liquidity screen to the Universe.

Regression Analysis Computations for Certain Embodiments

Computations are based upon multiple years of weekly price data.

No attempt to adjust or smooth the data for time or outliers.

Cross-asset correlations are considered as well as those against the benchmark.

Stock Selection and Optimization for Certain Embodiments

Mean-Variance style analysis chooses a basket of securities which attempts maximum diversification.

Initial analysis is run using an unconstrained optimization.

Exemplary Constraints

10/40:
- no more than 10% per name
- all holdings above 5% represent no more than 40% of the portfolio No explicit attempt to constrain by industry or common factors such as size, value/growth Liquidity constraints on the portfolio permitted to allow for greater capacity An embodiment uses the following methodology.

There is evidence that market portfolios are not as efficient as assumed in the CAPM. (Capital Asset Pricing Model. The general idea behind CAPM is that investors need to be compensated in two ways: time value of money and risk. The time value of money is represented by the risk-free rate in the formula and compensates the investors for placing money in any investment over a period of time. The other half of the formula represents risk and calculates the amount of compensation the investor needs for taking on additional risk. This is calculated by taking a risk measure (beta) that compares the returns of the asset to the market over a period of time and to the market premium.) We believe that risk and correlation are measures that have some consistency over time, while returns are so unpredictable that there is little reason for the CAPM market portfolio to be efficient.

Let $(X_1, X_2, \ldots, X_N)$ be a universe of assets. Let V be the covariance matrix of these assets, C the correlation matrix, and $B=(W_{b1}, W_{b2}, \ldots, W_{bN})$, with $$\sum_{i=1}^{N} W_{bi} = 1,$$

be a given benchmark portfolio composed of these assets.

Let $$\sum = \begin{bmatrix} \sigma_1 \\ \sigma_2 \\ \vdots \\ \sigma_N \end{bmatrix}$$

be the vector of asset volatilities.

Definition of a Risk Efficient Portfolio

A goal is to construct a portfolio $P=(W_{p1}, W_{p2}, \ldots, W_{pN})$, with $$\sum_{i=1}^{N} W_{pi} = 1,$$

composed of the same assets as the benchmark and that maximizes a ratio R, the Anti-Benchmark diversification ratio, where R is given by $$R = \frac{P\Sigma}{\sqrt{PVP}}$$

R can then be maximized with respect to variation of P.

$$\underset{P}{\text{Max}} R = \underset{P}{\text{Max}} \frac{P\Sigma}{\sqrt{PVP}} \qquad (1)$$

This enables maximization of diversification.

Certain embodiments may include constraints on P during the maximization.

If stock returns are proportional to their total risk, then maximizing R is equivalent to maximizing the Sharpe ratio, E(P)=PS and Max R is equivalent to $$\text{Max} \frac{E(P)}{\sqrt{PVP}}$$

Let us then build synthetic assets $(X'_1, X'_2, \ldots, X'_N)$, with $$X'_i = \frac{X_i}{\sigma_i} + \left(1 - \frac{1}{\sigma_i}\right)\$,$$

where $ is a risk free asset. For simplification, it may be assumed that $ has a return of zero. This is the Choueifaty Synthetic Asset Transformation.

Then the volatility $\sigma'_i$ of $X'_i$ is equal to 1, and $$\sum\nolimits' = \begin{bmatrix} 1 \\ 1 \\ \vdots \\ 1 \end{bmatrix}$$

since $X'_i$ have a normalized volatility of 1.

(1) then becomes (2)

$$\text{Max} \frac{P'\Sigma'}{\sqrt{P'V'P'}},$$

where P' is a portfolio composed of the synthetic assets and V' the covariance matrix of the synthetic assets.

(2) is then equivalent to $$\text{Max} \frac{1}{\sqrt{P'V'P'}}$$

Since all $X'_i$ have a normalized volatility of 1, V' is equal to the correlation matrix C of our initial assets, so (2) is equivalent to $$\text{Min} P'CP' \quad (3)$$

When trying to build a real portfolio, it is preferable to reconstruct synthetic assets by holding some real assets plus some cash. If $W=(W_1, W_2, \ldots, W_N)$, denotes the optimal weights for (3), then the optimal portfolio of real assets will be $$P_{opt} = \left(\frac{W_1}{\sigma_1}, \frac{W_2}{\sigma_2}, \ldots, \frac{W_N}{\sigma_N}, \left(1 - \sum_{i=1}^{N}\frac{W_i}{\sigma_i}\right)\$\right)$$

This step is the Choueifaty Synthetic Asset Back-Transformation.

We will call this optimal Anti-Benchmark portfolio the risk efficient portfolio.

Definition of an Embodiment of the Anti-Benchmark

Let's now suppose that we try to bring some improvement of the R ratio in an indexed portfolio, equivalent to the benchmark B in terms of risk/return characteristics.

We will add a proportion (scalar multiple) µ of a new portfolio P designed to optimize $$\text{Max}\frac{(\mu P+(1-\mu)B)\Sigma}{\sqrt{(\mu P+(1-\mu)V(\mu P+(1-\mu)B)}} \quad (4)$$

If we make the same assumption (1) on security returns, and the same use of synthetic assets, we can define B as a benchmark of synthetic assets plus some cash:

$$B = \left(w_{b1}\sigma_1, w_{b2}\sigma_2, \ldots, w_{bN}\sigma_N, \left(1 - \sum_{i=1}^{N}w_i\sigma_i\right)\right).$$

Let B' denote the non-cash part of B.
(4) is equivalent to $$\text{Max}\frac{\mu+(1-\mu)B'\Sigma}{\sqrt{(\mu P'+(1-\mu)B')V(\mu P'+(1-\mu)B')}}$$

and equivalent to (5) Min $\mu^2 P'CP' + (1-\mu)^2 B'CB' + 2\mu(1-\mu)P'CB'$ since the numerator is constant.

$(1-\mu)^2 B'CB'$ also is a constant, so (5) is equivalent to (6) Min $\mu^2 P'CP' + 2\mu(1-\mu)P'CB'$ Since µ is supposed to be small at the beginning (market cap weighted benchmarks are dominant), we will minimize the second term of (6), and our optimization program becomes $$\text{Min} P'CB' \quad (7)$$

Portfolios P and P' derived from equations (1), (3) and (7) all comprise Anti-Benchmark Portfolios with respect to any selected universe of securities, including but not limited to any selected benchmark.

Small-Cap Effect

Some small cap bias compared to an index is unavoidable because the large cap bias of market cap benchmarks is also a bias for overvalued assets. Anti-Benchmark will not have a linear relationship with small cap beta, however, and will bias securities which are mid-cap as easily as smaller cap within any universe. Large cap securities are avoided if they have a high covariance, but some large caps with lower covariance with the market will be purchased, so we will not necessarily be underweight large caps relative to the benchmark. See, e.g., Fernholz 2002.

Cyclical Factor Effect

Styles and common factors as commonly used by market participants are not explicitly related to Anti-Benchmark, which will avoid companies in a particular style when it is most in fashion, but will do so gradually over time. This leads Anti-Benchmark to have a somewhat anti-momentum bias over periods of less than one year. See, e.g., Amott/Hsu/Moore 2005.

Valuation Effect

Expected returns seem to be less than linearly related to beta, less so than CAPM would suggest. This is because it is not likely that market cap weighted benchmarks are the most efficient market portfolio. It can also be demonstrated that market capitalization weighted indices will be more likely to overweight overvalued securities, and Anti-Benchmark will not be systematically biased in this way. See, e.g., Black/Jensen/Scholes 1972, Black 1993, Amon/Hsu/Moore 2005, and Treynor 2005.

Comparison to Other Methods (1) Index Funds (William Sharpe)
Summary: Based on CAPM, assumption is that in equilibrium, the market portfolio is defined by the market capitalization of the securities in the market.

Advantages: (a) inexpensive; (b) transparent; (c) tax-efficient; and (d) low turnover.

Disadvantages: (a) cap weighting is not the most diversified; (b) tendency to overweight overvalued securities; and (c) the idea that all investors should simultaneously hold the market portfolio is not practical, among numerous theoretical limitations such as unlimited access to leverage and borrowing.

Some differences with Anti-Benchmark: (a) momentum bias relative to Anti-Benchmark; (b) Anti-Benchmark security weights are independent of the weightings by market cap; and (c) index funds are a passive strategy, while Anti-Benchmark is a systematic, quantitatively driven, active strategy.

(2) Index Trackers (Richard C. Grinold & Ronald N. Kahn, Barr Rosenberg)

Summary: Rather than attempt to hold the entire market capitalization benchmark as the market portfolio, it is possible to hold similar but actively chosen biases within risk constraints to the benchmark. If biases are carefully chosen using historical relationships underpinned by commonly held views about valuations and economic relationships, it is possible to construct portfolios with superior reward/risk characteristics than the market portfolio. Index trackers also include unbiased sampling portfolios, designed to mirror the return/risk characteristic of the market portfolio but with significantly fewer required holdings.

Advantages: (a) can improve on the diversification of index funds; (b) often alpha driven, so investors have potential out-performance; and (c) limited risk of underperformance of client benchmarks.

Disadvantages: (a) out-performance is limited by still trying to match the benchmark; and (b) turnover is substantially higher than the index funds, so not as tax efficient.

Some differences with Anti-Benchmark: (a) Anti-Benchmark attempts to have high tracking error to the index, while index trackers specifically limit the tracking error; and (b) most of the return of the Index trackers is just index related return, while arguably all the return of the Anti-Benchmark is tracking error to the index (although both are capturing the same market risk premium).

(3) Fundamental Indexes (Robert D. Arnott)

Summary: Measure size by some alternative measure to market capitalization.

The portfolios are constructed based on ranking variables such as book value, sales, number of employees, etc.

Advantages: (a) can improve on the diversification of index funds; (b) by design closer to the idea of market capitalization weighting, because the variables used to weight the securities have some correlation with market capitalization, so not much risk is taken relative to conventional indexing; and (c) potential out-performance by being somewhat unrelated to the index benchmark construction.

Disadvantages: (a) the size variables are arbitrary with no real theory as to why they should be better than market cap weightings; (b) large overlap with capitalization weightings so only limited benefit in that regard; and (c) may carry the same biases of active managers.

Some differences with Anti-Benchmark: (a) much higher beta to the market cap indices than Anti-Benchmark, which does a better job of avoiding the market cap weighted benchmark biases while also maintaining a similar return; and (b) diversification is a side-effect of the Fundamental Indexes, while it is the explicit design of the Anti-Benchmark, which should provide much better diversification for a client who holds other core equity strategies.

(4) Diversity Index (Robert Fernholz)

Summary: The method is based on the idea that the market will have a tendency towards diversification, with some random fluctuation in rankings by market capitalization. The diversity index is built with the idea that the rotation within a diversifying market provides a market structure effect which can be exploited to produce portfolios with superior reward to risk characteristics.

Advantages: (a) systematic approach to improve on the diversification of index funds; (b) can be applied with limited tracking error to the index benchmark; (c) not alpha driven, but potential out-performance of index benchmarks; and (d) underperformance of the market cap indices can be somewhat limited.

Disadvantages: (a) a small cap bias is explicitly built into the system; and (b) upside is limited by the amount of risk taken relative to the benchmark.

Some differences with Anti-Benchmark: (a) betas of Diversity indexes are generally designed to be close to one, while Anti-Benchmark has no beta target; and (b) Diversity indices are designed not to deviate very much from the index, while Anti-Benchmark is designed to vary as much as possible while still being mean-variance efficient.

Some Features of Embodiments of Anti-Benchmark

Anti-Benchmark is based on methods where a portfolio may be constructed using historical statistical relationships of past returns (especially covariance relationships) as the primary driver of security selection and weightings. Anti-Benchmark is a portfolio which should be close to mean-variance efficient, and is designed with the explicit purpose of diversifying an index portfolio and improving the reward to risk of the total benchmark+Anti-Benchmark holdings of an investor.

Anti-Benchmark is a new tool (and perhaps can be considered a distinct asset class) for investors to use for creating a diversifying counterbalance to the index and index tracking methodologies which have become so overwhelmingly popular in the fund management industry.

Anti-Benchmark has substantial tracking error to the index benchmark by design, while all other commonly used portfolio construction methods rely in part on the use of market capitalization in their weightings, therefore by design offering less diversification away from the benchmark.

Some advantages of some embodiments: (a) systematic approach to explicitly improve on the diversification of index and index tracking funds; (b) not alpha driven, but with a potential to out-perform index benchmarks; (c) upside not limited by any particular risk constraints; (d) can be used as a new asset class by asset allocators; and (e) turnover much lower than actively managed portfolios.

Some disadvantages of some embodiments: (a) a small cap bias is an inevitable side-effect, albeit not systematically built in like the diversity index; (b) large deviations from the index benchmark over multi-year periods may be beyond the tolerance of some investors.

Figure 2:
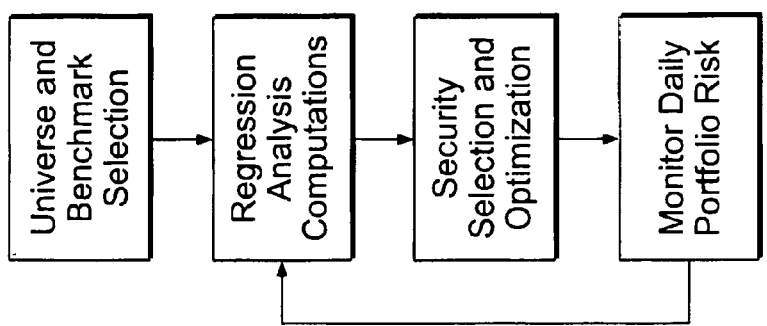
FIG. 2 depicts preferred back test methodology.

FIG. 2 depicts preferred back test methodology, as discussed above.

Example

Lehman Brothers Anti-Benchmark$^{SM}$ Euro Equity Fund

Lehman Bothers Asset Management's Anti-Benchmark strategy is a quantitative long-only beta product. The strategy will have low correlation, and potentially lower volatility and higher Sharpe Ratio compared to standard market cap weighted benchmarks. The product offers the flexibility of being tailored to any investor's benchmark, and can be utilized to increase the Sharpe ratio or decrease the total risk for any investor's long-beta exposure. Combining Anti-Benchmark with an Index Portfolio will provide investors the same risk premium with lower total risk. The fund offers investors a way to increase their diversification using a scalable long-only approach. This product will alleviate some of the pressure to search for scalable diversifying return through non-traditional sources.

Anti-Benchmark is a purely quantitative active portfolio management system. The starting point in our process is an investor universe screened for investability and for suitability to the model. The system then employs risk characteristics as the sole inputs to the security selection process. Correlation and covariance are utilized to select the securities, and final weightings are determined by optimizing the portfolio using standard portfolio optimization techniques. Optimization is performed on a weekly basis, but actual rebalancing is dependent on the deviation from optimal over time.

Risk management is a central part of our investment process. Investment constraints on the portfolio are built in by setting a maximum level of concentration in any given name. No explicit attempt is made to control for tracking error to a benchmark. Volatility is also not constrained, but is normally lower than the benchmark volatility. If Merger&Acquisition activity or other market information which is not explicitly handled by our model has a material impact on any of our holdings, it will be dealt with on a case by case basis based on the experience of the investment team.

Positions are monitored on a daily basis. Corporate actions and market information are analyzed for impact on the expected returns, and actions are taken if appropriate based on size of the risk and impact on the overall portfolio. In all cases changes to the portfolio weightings are implemented through optimization of the overall portfolio.

Additional Information about exemplary Back Test: The universe used for the back testing is the EuroStoxx Index, an index made up of 300+ constituents. An initial liquidity screen leaves approximately 150 stocks, based on historic traded volumes. Optimization is used to select and weight securities solely based on historical statistical data, built on rolling multiple years of data. Constraints on maximum exposure per name are imposed: maximum single holding of 5%, and no more than 40% in the largest 10 names. There is no restriction on tracking error, beta, industry, or other common factors. The resulting portfolio is made up of 20-25 names.

Figure 3:
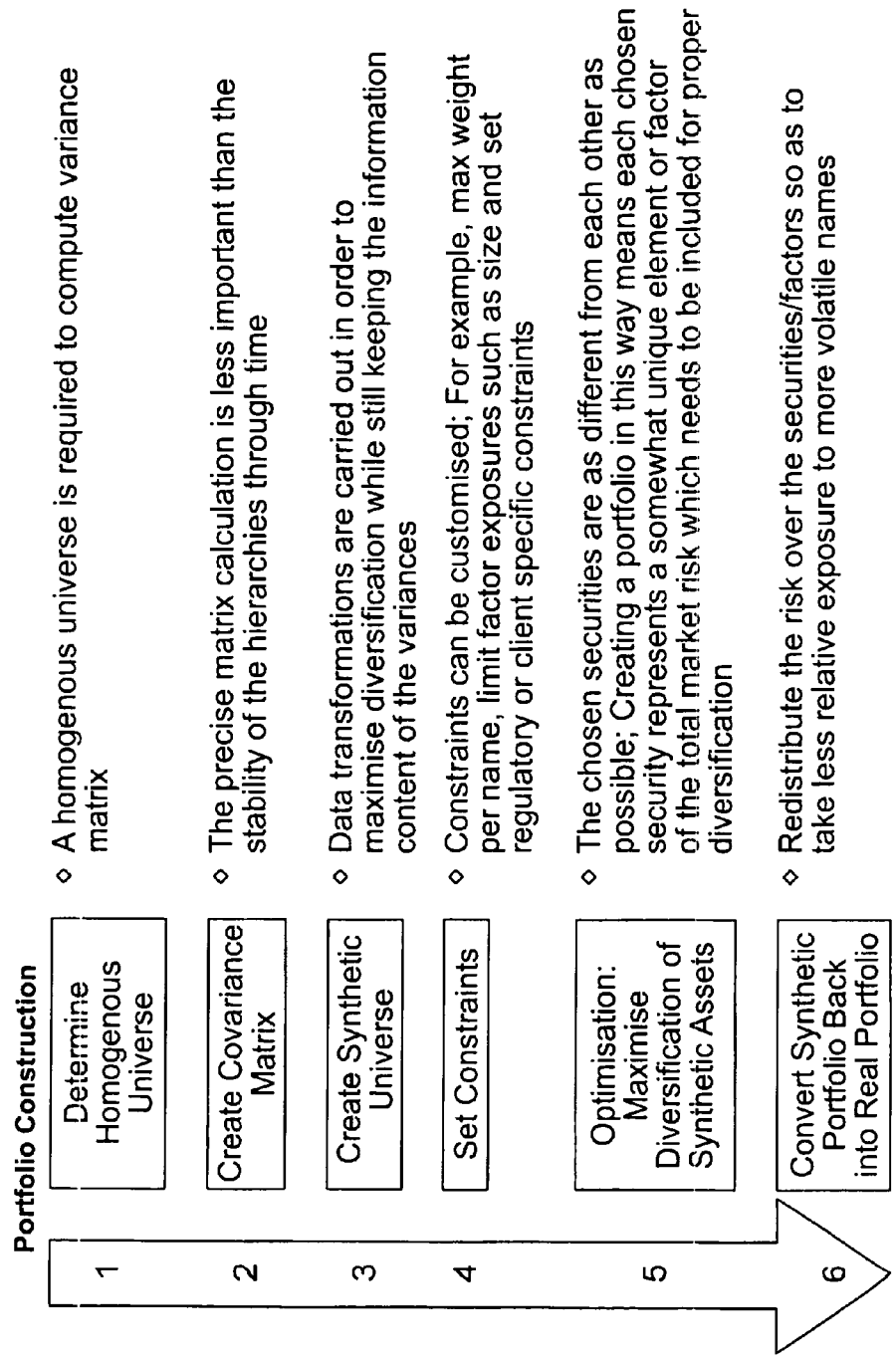
FIG. 3 provides an embodiment of Anti-Benchmark portfolio construction.

FIG. 3 contains an embodiment of Anti-Benchmark Portfolio Construction.

Summary of Backtest Results

Anti-Benchmark$^{SM}$ provided significant diversification benefits when combined with an index portfolio.
Anti-Benchmark$^{SM}$ exhibited consistently higher Sharpe ratio relative to standard market benchmarks.
Anti-Benchmark$^{SM}$ outperformed over multiple year time horizons.
Testing includes several different investment universes and computational approaches to stress test the theory:
  both narrow and broad indices (EuroStoxx-50, CAC-40, DAX-30, FTSE, Eurostoxx TMI);
  computational methods (Linear Programming, classical Mean-Variance, APT factor model); and
  frequency of Rebalance (annual, monthly, weekly).
Methods employed yielded intuitive results:
  broad indices provided more diversification benefit than narrow;
  all tested computational methods yielded similar results (90% or more correlated); and
  higher frequency yields higher returns, but results persist over less frequent rebalancing.

Performance Expectations

Anti-Benchmark$^{SM}$ targets maximum diversification and the capacity to capture the full market risk premium should not be diluted.
Anti-Benchmark$^{SM}$ will have a low predicted beta to the Benchmark, and should outperform during most periods of weaker markets; our empirical work indicates that beta is a poor predictor or the return of Anti-Benchmark over a market cycle, returns actually exceed the benchmark return over our testing period.
Evidence of outperformance in our backtest results has several potential explanations, among them:
  Market Capitalisation indices are inefficient and biased to being overweight, overvalued securities on average;
  Anti-Benchmark$^{SM}$ is a more efficient portfolio than cap weighted benchmarks due to the attempt in construction to maximise the diversification effect of the portfolio;
  Low beta securities have persistent ex-post return/risk above the theoretical Capital Market Line as predicted by CAPM.

It will be appreciated that the present invention has been described by way of example only and with reference to the accompanying drawings, and that improvements and modifications may be made to the invention without departing from the scope or spirit thereof.

What is claimed is:

1. A computer-implemented method for providing an anti-benchmark portfolio, the method comprising:
  acquiring, using a computer system, data regarding a first group of securities in a first portfolio, wherein the computer system comprises a computer processor and memory coupled to said processor;
  identifying, using a computer system, a second group of securities to be included in a second portfolio based on said data and on risk characteristics of said second group of securities; and
  providing, using a computer system, the individual weightings for each of the securities in said second portfolio according to one or more portfolio optimization procedures that maximizes the anti-benchmark ratio for the second portfolio wherein the anti-benchmark ratio is represented by the quotient of:
    a numerator comprising an inner product of a row vector of said holdings in said second portfolio and a column vector of a risk characteristic of return associated with said holdings in said second portfolio; and
    a denominator comprising the square root of a scalar formed by an inner product of said row vector of said holdings in said second portfolio and a product of a covariance matrix and a column vector of said holdings of said second portfolio.

2. The method according to claim 1, wherein said risk characteristic in the numerator is based on calculating the standard deviation of the returns of the securities.

3. The method according to claim 1, wherein said denominator is based on calculating the standard deviation of the returns of the portfolio.

4. The method according to claim 1, the method further comprising:
  providing, using a computer system, a combined portfolio consisting of a portion of said first portfolio and a portion of said second portfolio; and
  providing, using a computer system, the individual weightings for each of the securities in said combined portfolio according to one or more portfolio optimization procedures that maximizes the anti-benchmark ratio for the combined portfolio.

5. The method according to claim 1, wherein said second portfolio provides a full risk premium available in the pricing of the securities of said second portfolio.

6. The method according to claim 4, wherein the combined portfolio has a higher expected return than said first portfolio while having a lower expected volatility than said first portfolio.

7. The method according to claim 4, wherein the combined portfolio has a higher Sharpe ratio than said first portfolio.

8. The method according to claim 1, the method further comprising:
  providing, using a computer system, said individual weightings on a periodic basis.

9. The method according to claim 1, the method further comprising:
  transforming, using a computer system, said second portfolio into an equivariant portfolio via the Choueifaty Synthetic Asset Transformation and back-transforming said equivariant portfolio via the Choueifaty Synthetic Asset Back-Transformation.

10. A non-transitory computer readable medium having a computer program stored thereon which, when executed by a computer processor, performs a method for providing an anti-benchmark portfolio, the method comprising:
acquiring data regarding a first group of securities in a first portfolio, wherein the computer system comprises a computer processor and memory coupled to said processor;
identifying a second group of securities to be included in a second portfolio based on said data and on risk characteristics of said second group of securities; and
providing the individual weightings for each of the securities in said second portfolio according to one or more portfolio optimization procedures that maximizes the anti-benchmark ratio for the second portfolio wherein the anti-benchmark ratio is represented by the quotient of:
a numerator comprising an inner product of a row vector of said holdings in said second portfolio and a column vector of a risk characteristic of return associated with said holdings in said second portfolio; and
a denominator comprising the square root of a scalar formed by an inner product of said row vector of said holdings in said second portfolio and a product of a covariance matrix and a column vector of said holdings of said second portfolio.

11. The computer readable medium according to claim 10, wherein said risk characteristic in the numerator is based on calculating the standard deviation of the returns of the securities.

12. The computer readable medium according to claim 10, wherein said denominator is based on calculating the standard deviation of the returns of the portfolio.

13. The computer readable medium according to claim 10, the method further comprising:
providing a combined portfolio consisting of a portion of said first portfolio and a portion of said second portfolio; and
providing the individual weightings for each of the securities in said combined portfolio according to one or more portfolio optimization procedures that maximizes the anti-benchmark ratio for the combined portfolio.

14. The computer readable medium according to claim 10, wherein said second portfolio provides a full risk premium available in the pricing of the securities of said second portfolio.

15. The computer readable medium according to claim 13, wherein the combined portfolio has a higher expected return than said first portfolio while having a lower expected volatility than said first portfolio.

16. The computer readable medium according to claim 13, wherein the combined portfolio has a higher Sharpe ratio than said first portfolio.

17. The computer readable medium according to claim 10, the method further comprising:
providing said individual weightings on a periodic basis.

18. The computer readable medium according to claim 10, the method further comprising:
transforming said second portfolio into an equivariant portfolio via the Choueifaty Synthetic Asset Transformation and back-transforming said equivariant portfolio via the Choueifaty Synthetic Asset Back-Transformation.

19. A system for providing an anti-benchmark portfolio, the system comprising:
one or more computer processors;
memory, communicatively coupled to said one or more processors, which stores a computer program which, when executed by the one or more computer processors, performs a method for providing an anti-benchmark portfolio, the method comprising:
acquiring data regarding a first group of securities in a first portfolio, wherein the computer system comprises a computer processor and memory coupled to said processor;
identifying a second group of securities to be included in a second portfolio based on said data and on risk characteristics of said second group of securities; and
providing the individual weightings for each of the securities in said second portfolio according to one or more portfolio optimization procedures that maximizes the anti-benchmark ratio for the second portfolio wherein the anti-benchmark ratio is represented by the quotient of:
a numerator comprising an inner product of a row vector of said holdings in said second portfolio and a column vector of a risk characteristic of return associated with said holdings in said second portfolio; and
a denominator comprising the square root of a scalar formed by an inner product of said row vector of said holdings in said second portfolio and a product of a covariance matrix and a column vector of said holdings of said second portfolio.

20. The system according to claim 19, wherein said risk characteristic in the numerator is based on calculating the standard deviation of the returns of the securities.

21. The system according to claim 19, wherein said denominator is based on calculating the standard deviation of the returns of the portfolio.

22. The system according to claim 19, the method further comprising:
providing a combined portfolio consisting of a portion of said first portfolio and a portion of said second portfolio; and
providing the individual weightings for each of the securities in said combined portfolio according to one or more portfolio optimization procedures that maximizes the anti-benchmark ratio for the combined portfolio.

23. The system according to claim 19, wherein said second portfolio provides a full risk premium available in the pricing of the securities of said second portfolio.

24. The system according to claim 22, wherein the combined portfolio has a higher expected return than said first portfolio while having a lower expected volatility than said first portfolio.

25. The system according to claim 22, wherein the combined portfolio has a higher Sharpe ratio than said first portfolio.

26. The system according to claim 19, the method further comprising:
providing said individual weightings on a periodic basis.

27. The system according to claim 19, the method further comprising:
transforming said second portfolio into an equivariant portfolio via the Choueifaty Synthetic Asset Transformation and back-transforming said equivariant portfolio via the Choueifaty Synthetic Asset Back-Transformation.

* * * * *